Sept. 5, 1939.     R. L. SWARTZ     2,171,870
CAMERA TRIPOD
Filed Oct. 17, 1936

Inventor
Richey L. Swartz
By
Attorneys

Patented Sept. 5, 1939

2,171,870

UNITED STATES PATENT OFFICE 2,171,870

CAMERA TRIPOD

Richey L. Swartz, Canton, Ohio, assignor of one-half to Kenneth B. Cope, Canton, Ohio Application October 17, 1936, Serial No. 106,182

6 Claims. (Cl. 248—168)

The invention relates to tripods especially adapted for use in supporting cameras.

The ordinary camera tripod such as is in general use by photographers for supporting view cameras such as are commonly used for work outside of the studio comprises a table to which are detachably pivotally connected three legs usually formed of wood. Each leg is independently pivoted to the table and each is independently adjustable in length so as to compensate for unevenness in the ground upon which the tripod is supported as well as for tilting the table which supports the camera.

Such tripods are a continual source of annoyance to the photographers using the same for the reason that there is no positive means for holding the legs in adjusted position and it frequently happens that one leg of such a tripod will slip, causing the camera to fall, resulting in the destruction of or serious damage to valuable cameras and lenses.

The object of the present invention is to provide means for individually locking each leg of the tripod in adjusted position so as to hold the entire tripod rigid and prevent slipping of one leg upon the ground and the resultant overturning of the tripod and camera.

Another object is to provide means for tilting the table of the tripod to any desired angle without disturbing the position of the legs of the tripod, whereby the camera may be set at any necessary angle.

The above objects, together with others which will be apparent from the drawing and following description, or which may later be referred to, may be attained by constructing the improved tripod in the manner illustrated in the accompanying drawing, in which Figure 1 is a side elevation of the table and upper portions of the legs of a tripod of conventional construction provided with the improved locking means upon the legs;

Similar numerals refer to similar parts throughout the drawing.

Figure 1:
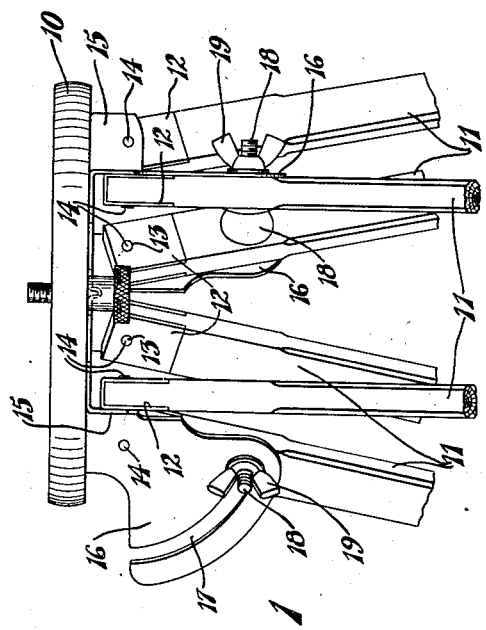
Figure 2:
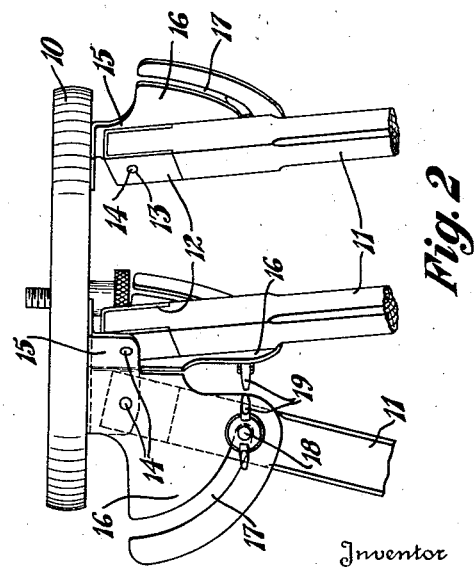
Fig. 2 is a view similar to Fig. 1, viewed substantially at right angles thereto.

Referring first to the disclosure in Figs. 1 and 2 of the drawing, the conventional wooden tripod is shown, having the usual table 10 to which are arranged to be detachably pivoted three telescoping legs of usual and well known construction.

As in common practice, the upper end of each of these legs comprises two spaced wooden strips 11 preferably provided with sheet metal caps 12 and having apertures 13 therein by means of which the legs are detachably pivotally connected to the studs 14 mounted upon the depending brackets 15 connected to the underside of the table 10, all as in usual and well known practice.

The tripod as thus far described is the ordinary type of tripod now in general use by photographers for supporting cameras for taking pictures outside of the studio. With tripods of this construction, there is no means of locking the legs against accidental movement and since it is frequently necessary to set the tripod up upon uneven ground or upon smooth or polished floors, the invention contemplates the provision of means for locking the legs in adjusted position.

The invention to which the application pertains consists in an individual locking means for each leg of the tripod so that each leg may be adjusted to any required length, regardless of the other legs, in order to compensate for uneven ground upon which the tripod is placed or to tilt the table 10 at any necessary angle in order to properly position the camera for the picture to be taken.

Although the invention may be carried out in numerous ways, the form of locking means illustrated comprises an ear or flange 16 which may be fixed to and depend from the underside of the table 10 adjacent to each of the legs. As shown in Figs. 1 and 2, these ears or flanges may be formed integral with the depending brackets 15 although it should be understood that where the invention is applied to a tripod already in use, these ears or flanges 16 may be separate members attached in the position shown and described.

Each ear 16 has an arcuate slot 17 therein concentric with the pivot point 14 of the corresponding leg of the tripod and preferably open at one end so as to permit the legs of the tripod to be removed from the table for transporting the same as in usual practice. A bolt 18 is carried by each leg and extends through the arcuate slot 17 of the corresponding ear 16, being provided with a thumb nut or the like is indicated at 19 for clamping the leg to the ear in any adjusted position.

With this construction it will be seen that the legs may be assembled upon the table of the tripod as in ordinary practice, the bolt 18 of each leg being engaged in the arcuate slot 17 of the corresponding ear 16 and the nut 19 tightened when the leg is adjusted to the desired position, whereby each leg may be independently adjusted and clamped in adjusted position, permitting the tripod to be set up upon uneven ground or upon a polished floor or other surface with the table 10 level or tilted at any desired angle, the entire tripod being rigidly clamped in the desired position so as to prevent accidents causing damage to the camera supported thereon.

Figure 4:
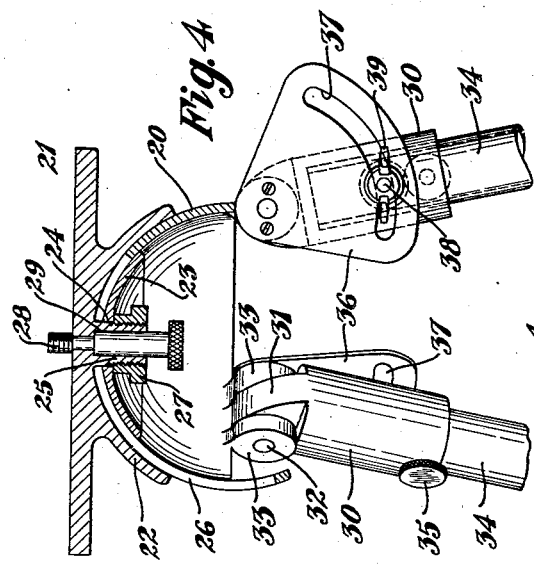
Fig. 4 is a section taken substantially as on the line 4—4, Fig. 3.
Figure 3:
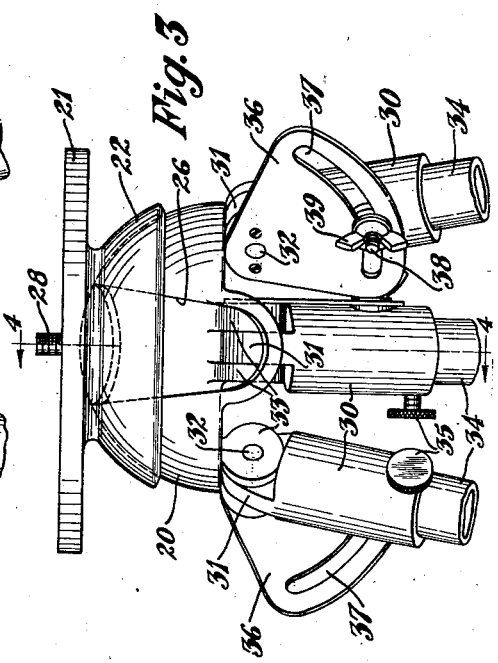
Fig. 3 is a side elevation of the table and upper portions of the legs of the improved tripod showing the table tilting means.

In Figs. 3 and 4 is shown a form of the invention in which the table of the tripod may be tilted to any desired angle and clamped in position without disturbing the adjustment of the legs. In carrying out this form of the invention, a hollow semispherical base 20 is provided for the table 21 which has the cup 22 formed on its underside and adapted to receive the semispherical base 20.

A curved clamping plate 23 is adapted to fit within the semispherical base 20 and is provided with a central aperture 24 which receives the externally threaded hollow boss 25 depending from the table 21 and extended through the slot 26 in the semispherical base 20, which slot is of proper size and shape to permit of any required adjustment of the table relative to the base 20, a nut 27 being provided upon the threaded boss for clamping the table in adjusted position upon the base. The usual screw 28 for attaching the camera to the table of the tripod may be swiveled within a suitable bore 29 in the table and boss 25 in usual and well known manner.

For the purpose of attaching the legs, sleeves 30 may be provided at their upper ends with lugs 31 pivotally connected as at 32 to the depending lugs 33 which may be formed integral with the base 2C. The legs indicated at 34 may be in the form of metal tubes preferably of any usual and well known telescoping arrangements, the upper ends thereof being adapted to be inserted within the pivoted sleeves 30 and fixed therein as by the set screws 35.

For the purpose of individually locking the legs in adjusted position, in the manner described and illustrated with reference to Figs. 1 and 2, an arcuate ear or plate 36 may be formed integrally with or fixed to one lug 33 of each pair and provided with an arcuate slot 37 concentric with the corresponding pivotal point 32 and adapted to receive the bolt 38 carried by the corresponding sleeve 30, a wing nut or the like as indicated at 39 being provided upon each bolt for clamping the corresponding leg in adjusted position.

With this construction it will be seen that the tripod may be rigidly mounted upon any surface regardless of whether it be uneven or polished without danger of any of the legs slipping and upsetting the tripod and camera thereon. After the legs are properly adjusted and locked in position, the table 21 may be tilted to any desired or necessary position and locked upon the base.

I claim:

1. A tripod including a table, legs pivotally connected to the table, ears carried by the table and provided with slots open at one end and locking screws carried by the legs and received in the slots of the ears for independently locking each leg in adjusted position relative to the table.

2. A tripod including a table, legs pivotally connected to the table, ears carried by the table and having arcuate slots concentric with the pivots of the legs and open at one end, and locking screws carried by the legs and received in said arcuate slots of the ears for independently locking each leg in adjusted position relative to the table.

3. A tripod including a table, ears depending from the table, a leg pivotally connected to the upper portion of each ear, there being an arcuate slot in each ear extending from a point below the pivot point upward and outward through the outer edge of the ear, and a locking screw carried by the leg and received in said arcuate slot for independently locking each leg in adjusted position relative to the table and permitting disengagement of the locking screw from the arcuate slot.

4. A tripod including a table, ears depending from the table, a leg detachably, pivotally connected to the upper portion of each ear, there being an arcuate slot in each ear extending from a point below the pivot point upward and outward through the outer edge of the ear, and a locking screw carried by the leg and received in said arcuate slot for independently locking each leg in adjusted position relative to the table and permitting disengagement of the leg from the ear.

5. A tripod including a table, spaced pairs of depending lugs upon the under side of the table, a substantially triangular ear rigidly supported by and depending from one lug of each pair, a leg pivotally connected between each pair of lugs, there being an arcuate slot in each ear concentric with the corresponding pivotal connection, and locking screws carried by the legs and received in said arcuate slots of the ears for independently locking each leg in adjusted position relative to the table.

6. A tripod including a support member, spaced pairs of depending lugs upon the under side of the support member, a substantially triangular ear rigidly supported by and depending from one lug of each pair, a leg pivotally connected between each pair of lugs, there being an arcuate slot in each ear concentric with the corresponding pivotal connection, and locking screws carried by the legs and received in said arcuate slots of the ears for independently locking each leg in adjusted position relative to the support member.

RICHEY L. SWARTZ.